United States Patent
Ma et al.

(10) Patent No.: US 9,698,585 B2
(45) Date of Patent: Jul. 4, 2017

(54) COMPOSITE TOWER FOR POWER TRANSMISSION LINES OF POWER GRID AND COMPOSITE CROSS ARM STRUCTURE THEREOF

(71) Applicant: Jiangsu Shenma Electric Co., Ltd., Rugao, Jiangsu (CN)

(72) Inventors: Bin Ma, Rugao (CN); Yong Zhu, Rugao (CN); Jie Yu, Rugao (CN); Weidi Cao, Rugao (CN); Xizhong Liu, Rugao (CN)

(73) Assignee: Jiangsu Shenma Electric Co., Ltd., Rugao, Jiangsu (CN)

( * ) Notice: Subject to any disclaimer, the term of this patent is extended or adjusted under 35 U.S.C. 154(b) by 0 days.

(21) Appl. No.: 14/438,416

(22) PCT Filed: Oct. 24, 2013

(86) PCT No.: PCT/CN2013/085886
§ 371 (c)(1),
(2) Date: Apr. 24, 2015

(87) PCT Pub. No.: WO2014/063645
PCT Pub. Date: May 1, 2014

(65) Prior Publication Data
US 2015/0295392 A1    Oct. 15, 2015

(30) Foreign Application Priority Data
Oct. 25, 2012 (CN) .......................... 2012 1 0411674

(51) Int. Cl.
*H02G 13/00* (2006.01)
*H02G 7/05* (2006.01)
(Continued)

(52) U.S. Cl.
CPC ............... *H02G 7/05* (2013.01); *E04H 12/02* (2013.01); *E04H 12/24* (2013.01); *E04H 12/10* (2013.01)

(58) Field of Classification Search
CPC    H02G 7/14; H02G 7/20; H02G 7/056; H02G 7/125; H02G 7/12; H02G 1/02;
(Continued)

(56) References Cited
U.S. PATENT DOCUMENTS 2,300,351 A * 10/1942 Dougherty .............. E04H 12/10
                                                    52/40
2,587,587 A *  3/1952 Bellezza et al.
(Continued)

FOREIGN PATENT DOCUMENTS

CN    201531140    7/2010
CN    201539123    8/2010
(Continued)

*Primary Examiner* — Pete Lee
(74) *Attorney, Agent, or Firm* — Diederiks & Whitelaw, PLC (57) ABSTRACT

A composite power transmission tower, and a composite cross arm structure of a composite tower for power grid transmission line is provided, including two sets of cross arm insulators arranged into a V-shaped arrangement horizontally, wherein a first end of each of the two sets of cross arm insulators is connected to the tower body of the composite tower at an opening of the V-shaped arrangement; and a set of oblique-pulling insulators, corresponding to each of the sets of cross arm insulators respectively, has one end connected to a second end of each of the two sets of cross arm insulators at an apex of the V-shaped arrangement, and the other end connected to the tower body over the two sets of cross arm insulators.

10 Claims, 5 Drawing Sheets

(51) Int. Cl.
*E04H 12/02* (2006.01)
*E04H 12/24* (2006.01)
*E04H 12/10* (2006.01)

(58) Field of Classification Search
CPC .. H02G 7/02; H02G 7/08; H02G 3/26; H02G 7/05; H02G 3/32; H02G 7/00; H02G 7/053; F16L 3/1233; F16L 59/135; H01R 4/643; H01B 7/00; H01B 17/14; H01B 17/16; H01B 17/265; H01B 17/00; H01B 3/00; H01B 1/00; E04H 12/24; E04H 12/02; E04H 12/10
USPC ..... 174/40 TD, 45 R, 40 CC, 45 TD, 42–44, 174/158 R, 137 R, 162, 40 R, 4 R, 149 R; 52/40, 651.01
See application file for complete search history.

(56) References Cited

U.S. PATENT DOCUMENTS

| | | | |
|---|---|---|---|
| 3,291,899 A | 12/1966 | Ward et al. | |
| 3,586,758 A * | 6/1971 | Harmon | H01B 17/16 174/158 R |
| 3,603,717 A * | 9/1971 | Scott | H02G 7/20 174/45 R |
| 4,458,102 A * | 7/1984 | White | H02G 7/20 174/149 R |
| 4,523,054 A * | 6/1985 | Baker | H01B 17/00 174/148 |
| 4,615,154 A * | 10/1986 | Troutner | E04H 12/04 174/45 R |
| 5,777,262 A * | 7/1998 | Nourai | H02G 7/20 174/40 R |
| 6,026,627 A * | 2/2000 | Moore | E04H 12/10 343/890 |
| 7,057,103 B1 * | 6/2006 | Peabody | H02G 7/14 174/40 R |
| 2010/0064598 A1 | 3/2010 | Lee et al. | |
| 2012/0168192 A1 | 7/2012 | Sun et al. | |
| 2012/0205139 A1 * | 8/2012 | Cotton | H02G 7/053 174/162 |
| 2013/0081872 A1 * | 4/2013 | Lee | H02G 7/00 174/45 R |

FOREIGN PATENT DOCUMENTS

| | | |
|---|---|---|
| CN | 201649767 | 11/2010 |
| CN | 101964505 | 2/2011 |
| CN | 101964507 | 2/2011 |
| CN | 202401815 | 8/2012 |
| CN | 202899719 | 4/2013 |
| JP | H0579817 | 3/1993 |
| JP | H07308016 | 11/1995 |
| JP | 2005248585 | 9/2005 |
| KR | 10-2010-0080736 | 7/2010 |
| RU | 13385 | 4/2000 |
| WO | WO 2007/121881 | 11/2007 |
| WO | WO 2011/026310 | 3/2011 |

* cited by examiner

COMPOSITE TOWER FOR POWER TRANSMISSION LINES OF POWER GRID AND COMPOSITE CROSS ARM STRUCTURE THEREOF

CROSS-REFERENCE TO RELATED APPLICATIONS

This application represents a National Stage application of PCT/CN2013/085886 entitled "Composite Tower for Power Transmission Lines of Power Grid and Composite Cross Arm Structure Thereof" filed Oct. 24, 2013, pending.

FIELD

The present invention relates generally to a power transmission tower, and more particularly, to a composite tower for power grid transmission line.

BACKGROUND

A power transmission tower is a structure adapted to support conductors and lightning wires of high voltage overhead transmission lines. The existing high-voltage transmission tower is made from a steel material, and consisted of three parts: tower head, tower body and tower leg. For example, the Chinese Patent Application No. 201010297983.1 has disclosed a high voltage structure of typical model with a shape like a Chinese character 'gan' ( 干 ). A cross arm made of conductive metal material and extended form a tower body that is electrically grounded can be used to suspend the transmission conductors to support the weight of the conductors. The transmission conductor needs to keep a certain electrical safe distance from the ground point to avoid flashover accident caused by ground discharge, so the metal cross arm should have a sufficient length and a long insulator string is added on the free end of the cross arm, to make the charged transmission conductor spaced from the grounded metal cross arm to ensure the insulation distance.

Because the existing high-voltage transmission tower adopts an all-steel structure, it has defects of heavy weight, easy to be rusted or crack and poor performance at a low temperature, and it also has difficulties in construction, transportation, operation and maintenance. Furthermore, considering that the wind load may make the suspension insulator string be tilted at a wind yaw angle to cause a decrease in the air gap between the transmission line and the tower body of the power transmission tower during normal operation, in order to secure the air gap between the transmission line (charged body) and the tower body (grounded body) from being broken down, the impact of the wind yaw angle should be considered when the design of the cross arm that the length of the cross arm should be increased accordingly, which must lead to increase the width of the entire transmission line corridor and the floor space of the entire transmission line.

In view of the above defects in the steel tower, the applicant of the present invention has presented a Chinese Patent Application No. 201010115171.0 related to a composite insulating tower for power grid transmission line. In the composite insulating tower disclosed by the application, because a cross arm made of a composite material is served as a support for transmission line, the length of the insulator string can be reduced or the suspension insulator string can be avoided to be used, so as to reduce the length of the cross arm, the cost of the tower, the weight of the tower and the floor space occupied by the power transmission tower. However, the cross arm of the composite tower only consists of one insulation rod, which is relatively thin and cannot satisfy the support for the high voltage transmission line.

SUMMARY

In view of the above, an object of the present invention is to provide a composite cross arm structure suitable for the high voltage power transmission line and a composite tower used the composite cross arm structure.

According to one aspect of the present invention, a composite cross arm structure of a composite tower for power grid transmission line is provided, in which the composite cross arm structure includes: two sets of cross arm insulators arranged into a V-shaped arrangement horizontally, wherein a first end of each of the two sets of cross arm insulators is connected to the tower body of the composite tower at opening of the V-shaped arrangement; and a set of oblique-pulling insulators, one end of which is connected to a second end of each of the two sets of cross arm insulators at apex of the V-shaped arrangement, and the other end of which is connected to the tower body over the two sets of cross arm insulators.

In this aspect of the invention, the composite cross arm structure is constituted by the cross arm insulators and the set of oblique-pulling insulators in a V-shaped triangular structure, that is, the two sets of cross arm insulators are arranged at a angle between them to form a triangular frame, and suspended on the tower body by the set of oblique-pulling insulators at free ends of the two sets of cross arm insulators away from the tower body, in this way, the composite cross arm structure is stable, capable of bearing high pressure, and can be used to suspend high voltage power transmission line.

Preferably, each of the sets of cross arm insulators corresponds to one set of oblique-pulling insulators, one end of the set of oblique-pulling insulators is connected to the second end of the corresponding set of cross arm insulators at apex of the V-shaped arrangement, and the other end of the set of cross arm insulator is connected to the tower body over the corresponding set of cross arm insulators.

Preferably, the angle between the two sets of cross arm insulators is between 15° to 75° at apex of the V-shaped arrangement. The large the angle is, the more mechanical strength born by the product is, but in order to ensure the insulation distance of the cross arm, the length of the cross arm and the width of the tower body are increased with an increase of the angle, which leads to high cost, so the angle is controlled from 15° to 75°.

Preferably, the cross arm insulator is a hollow insulator. The hollow insulator is lightweight, has high mechanical strength, can meet mechanical property requirements of the tower, and is low-cost.

Preferably, there are two hollow insulators which are coupled with each other via a flange. In this way, the length of the cross arm can be lengthened to meet requirements of the higher voltage transmission line.

Preferably, the composite cross arm structure further includes an auxiliary cross arm insulator, and two ends of the auxiliary cross arm insulator are connected to the flange of each of the two set of the cross arm insulators to make the two set of the cross arm insulators and the auxiliary cross arm insulator form an A-shaped arrangement together horizontally. The arrangement of the auxiliary cross arm insulator make the triangular cross arm structure more stable, and meet requirements of the higher voltage transmission line.

Preferably, the set of oblique-pulling insulators is a line insulator.

Preferably, the composite cross arm structure further includes middle insulation pulling rods corresponding to each of the sets of cross arm insulators respectively, one end of the middle insulation pulling rod is connected to the flange of the cross arm insulator, and the other arm of the middle insulation pulling rod is connected to the tower over the cross arm insulator. The arrangement of the middle insulation pulling rod can enhance the capability of the cross arm to bear pressure and bending force to meet requirements of the higher voltage transmission line.

Preferably, the middle insulation pulling rod is a post insulator. The post insulator is rigid so as to take some of the pulling force born by the cross arm when the end of the cross arm coupled to a transmission line, and the pressure induced by wind born by the cross arm.

Preferably, the set of oblique-pulling insulators is a hollow insulator. The hollow insulator is low-cost and light-weight.

Preferably, the set of oblique-pulling insulator has two hollow insulators, and the two hollow insulators are coupled with each other via a flange. In this way, the end of the cross arm can be better supported under pulling force through the connection of the flange.

Preferably, the composite cross arm structure further includes a second connection insulator and a third connection insulator configured to connect each of the sets of cross arm insulators to a corresponding set of oblique-pulling insulators, two ends of the second connection insulator are connected to the flange of the set of cross arm insulators and the flange of the set of oblique-pulling insulators respectively, one end of the third connection insulator is connected to the flange of the set of oblique-pulling insulators, and the other end of the third connection insulator is connected to the tower body at the first end of the cross arm insulator. With such configuration, these cross arms can be connected to a whole one to bear the force better.

According to another aspect of the present invention, a composite tower for power grid transmission line is provided, in which the composite tower includes a tower body and at least one composite cross arm structure as above installed on the tower body.

Preferably, the tower body of the composite tower is made of composite components.

Preferably, the composite tower further includes a tower head which is made of composite components.

These aspects or other aspects of the present invention will be clearly described with reference to the following exemplary embodiments.

BRIEF DESCRIPTION OF THE DRAWINGS

Structures, operations, and further objects and advantages of the present invention may be best understood by reference to the following description taken in conjunction with the accompanying drawings, in which like numerals denote like elements, and characterized in that.

DETAILED DESCRIPTION

In the following description of embodiments, reference is made to the accompanying drawings which form a part hereof, and in which it is shown by way of illustration specific embodiments of the invention that can be practiced. It is to be understood that other embodiments can be used and structural changes can be made without departing from the scope of the disclosed embodiments.

Figure 1:
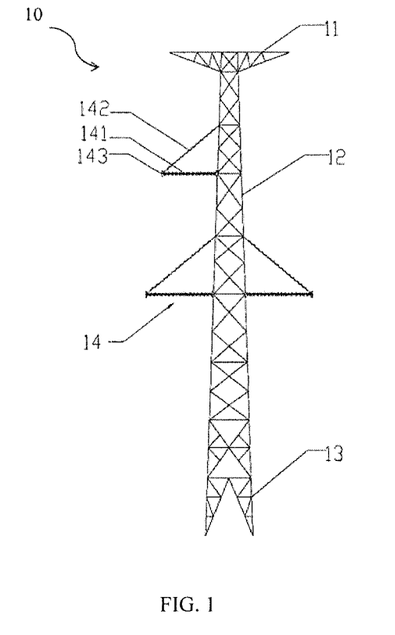
FIG. 1 is a schematic front view illustrating a composite tower for power grid transmission line, in accordance with the first embodiment of the present invention.

FIG. 1 illustrates a composite tower 10 for power grid transmission line, in accordance with the first embodiment of the present invention. The composite tower 10 is a tower with a shape like a Chinese character 'shang' ( 上 ), i.e., a single circuit transmission line tower. As shown in FIG. 1, the composite tower 10 includes a tower head 11, a tower body 12, a tower foot 12 and three composite cross arm structures 14 fixed on the tower body 12. In the embodiment, the tower head 11, the tower body 12 and the tower body 12 are of steel structure, but noted that both of the tower head 11 and the tower body 12 are made of composite components. The composite component mentioned here can be prepared by pultrusion or winding process to a main rod presented in the Chinese Patent Application No. 201010115171.0, titled "Composite Insulating Tower for Power Grid Transmission Line", filed by the applicant of the present invention, which needs not be repeated here.

Figure 2:
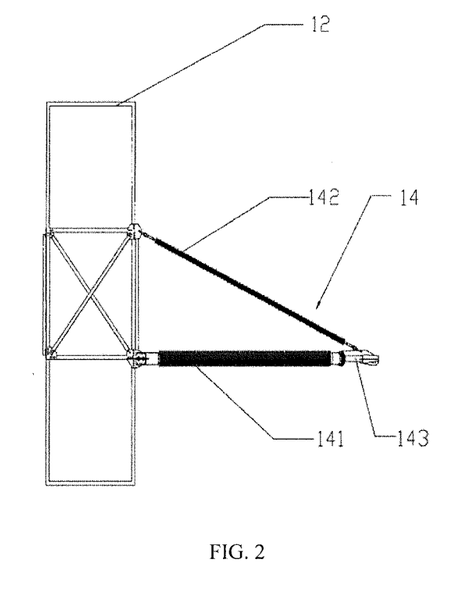
FIG. 2 is a partial enlarged view illustrating a composite cross arm structure of the composite tower for power grid transmission line as shown in FIG. 1, in accordance with the first embodiment of the present invention.
Figure 3:
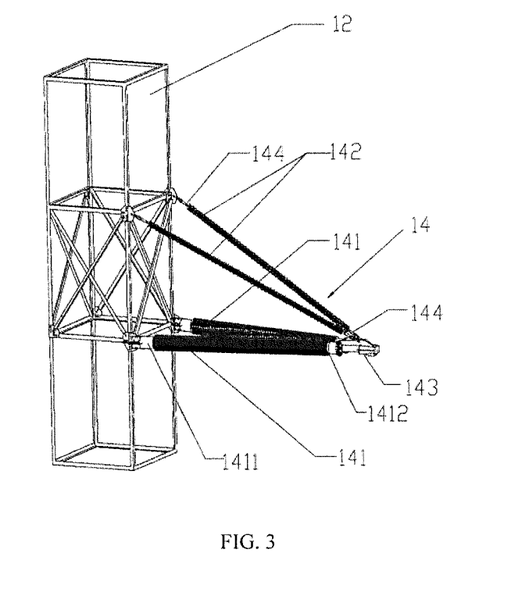
FIG. 3 is a perspective view of the structure of FIG. 2.

As shown in FIG. 1, the composite tower 10 with a shape like a Chinese character 'shang' ( 上 ) has three composite cross arm structures 14, in which the uppermost composite cross arm structure is regarded as upper cross arm, and the lower two composite cross arm structures are regarded as lower cross arm. In the embodiment, the composite cross arm structure as the first embodiment is shown in FIGS. 2 and 3, including two sets of cross arm insulators 141 and a set of oblique-pulling insulators 142 corresponding to each of the sets of cross arm insulators 141 respectively, in which, the two sets of cross arm insulators 141 are arranged into a V-shaped arrangement horizontally, a first end 1411 of each of the two sets of cross arm insulators 141 is connected to the tower body 12 of the composite tower 10 at opening of the V-shaped arrangement with plate-type metal connector 143. One end of the set of oblique-pulling insulators 142 is connected to a second end 1412 (i.e., free end) of the set of cross arm insulators 141 at apex of the V-shaped arrangement by being hung on the metal connector 143, and the other end of the set of oblique-pulling insulators 142 is connected to the tower body 12 over the set of cross arm insulators 141. It should be noted that the direction of the V-shaped arrangement is that its opening faces the tower body and its apex is a free end adapted for hanging the transmission line.

The composite cross arm structure 14 is constituted by the set of cross arm insulators and the set of oblique-pulling insulators in a V-shaped (triangular) structure, that is, the two sets of cross arm insulators are arranged at a angle between them to form a triangular frame, and suspended on the tower body by the set of oblique-pulling insulators at free ends of the two sets of cross arm insulators away from the tower body, in this way, the composite cross arm structure is stable, capable of bearing high pressure, and can be used to suspend high voltage power transmission line, such as 750 KV high voltage power transmission lin. As shown in FIG. 3, the two sets of cross arm insulators 141 form an angle between them at apex of the V-shaped arrangement. The angle can be configured to be form 15° to 75°. The large the angle is, the more mechanical strength born by the product is, but in order to ensure the insulation distance of the cross arm, the length of the cross arm and the width of the tower body are increased with an increase of the angle, which leads to high cost, so the angle is controlled from 15° to 75°. In the embodiment, the angle α is 30°. With such configuration, it not only ensures the needs of bearing force in actual working conditions, but also ensures that the length of the cross arm insulator and the width of the tower body are optimal, with the most beautiful appearance.

In the embodiment, each of the sets of cross arm insulators 141 of the composite cross arm structure 14 is a hollow insulator in a form of pressure pipe, made of a composite material. For example, it can be an epoxy FRP pipe that undertakes the mechanical strength, its interior is hollow and filled with polyurethane foam, and its exterior has a silicon rubber material as sheath and shed for insulation protection. It should be noted that the epoxy FRP pipe can be replaced by a winding pipe of vinyl material or polyurethane material. When the interior of the epoxy FRP pipe is hollow, the interior can be filled with insulating gas, insulating oil or solid insulating medium, and optionally, the interior of the epoxy FRP pipe can be solid. The silicon rubber material can be high temperature vulcanized silicone rubber, room temperature vulcanized silicone rubber or liquid silicone rubber. The preparation of the cross arm insulator is not really the point of the present invention, so the detail is not described here, which can refer to the Chinese Patent Application No. 201010115171.0.

For the pressure pipe to bear pressure and bending force, the end metal component or metal flange is mounted on the pressure pipe by cementing process or interference fit, and the cementing ratio (length of the flange:pipe diameter) is 0.8~1.5, which can better improve the anti-pressure ability and the tensile ability. Specifically, the cementing structure of the hollow insulator is formed in such way that process a plurality of circular metal grooves on the inside of the metal component, process cementing grooves with the same size corresponding to the coupling location on the outside surface of the pressure pipe, the pressure pipe is muff-coupled with the metal component, a glue solution is injected into and fills the space between the coupled metal grooves and cementing grooves via an auxiliary hole at the root, and carry out the solidification for a long time under the room temperature, in which the solidifying time is generally form 8 hours to 16 hours, and optionally, the solidification can be accelerated by external heating, with solidifying temperature from 100° C. to 150° C., and with the solidifying time from 1 hour to 4 hours.

In the embodiment, the set of oblique-pulling insulators 142 is a line insulator, in the form of a pulling rod of composite material. The pulling rod 142 adopts a pultrusion solid bar, the composite material is epoxy, vinyl or polyurethane material, and the exterior of the pulling rod 142 has a silicon rubber material for insulation protection. The set of oblique-pulling insulators 142 is adapted to suspend the cross arm insulator 141 on the tower body 12, and two ends of the set of oblique-pulling insulators 142 can be connected with the cross arm insulator 141 and the tower body 12 via an end metal component 144 respectively, as shown in FIG. 3. The end metal component 144 of the set of oblique-pulling insulators 142 is fixed by traditional crimping process.

The metal cross arm of the traditional high voltage (such as 750 kV) tower can be replaced by the above composite cross arm so that the suspension insulator used in the traditional tower can be eliminated completely or shortened, thus eliminating the decrease in distance caused by the wind yaw of the suspension insulator, and the risk of breakdown of air gaps, which can greatly shorten the length of the cross arm and reduce the width of the line corridor.

Figure 4:
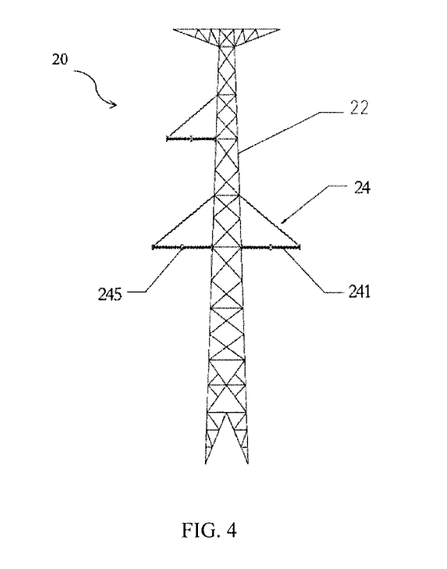
FIG. 4 is a schematic front view illustrating a composite tower for power grid transmission line, in which the composite tower has a composite cross arm structure, in accordance with the second embodiment of the present invention.

FIG. 4 illustrates a composite tower 20 for power grid transmission line in accordance with the second embodiment of the present invention. The difference between the embodiment and the first embodiment shown in FIG. 1 is that in the embodiment, each of the two sets of cross arm insulators 241 of the composite cross arm structure 24 of the second embodiment is constituted by two hollow insulators, as shown in FIG. 4. The two hollow insulators are coupled with each other via a flange 245. In such configuration, the length of the composite cross arm 24 can be lengthened to meet requirements of the higher voltage transmission line.

Figure 5:
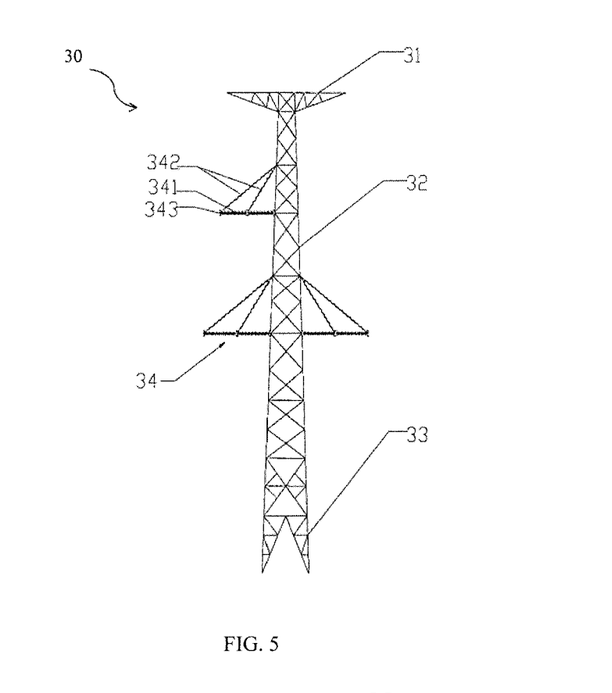
FIG. 5 is a schematic front view illustrating a composite tower for power grid transmission line, in accordance with the third embodiment of the present invention.
Figure 6:
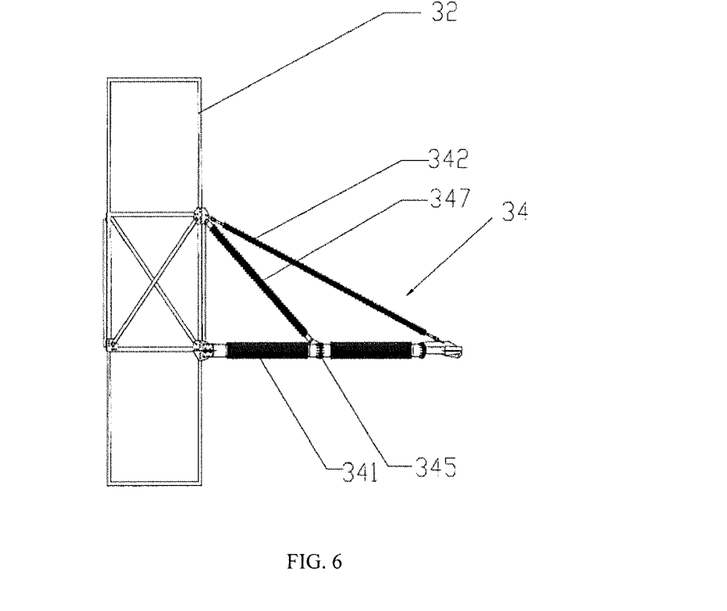
FIG. 6 is a partial enlarged view illustrating a composite cross arm structure of the composite tower for power grid transmission line as shown in FIG. 5, in accordance with the third embodiment of the present invention.
Figure 7:
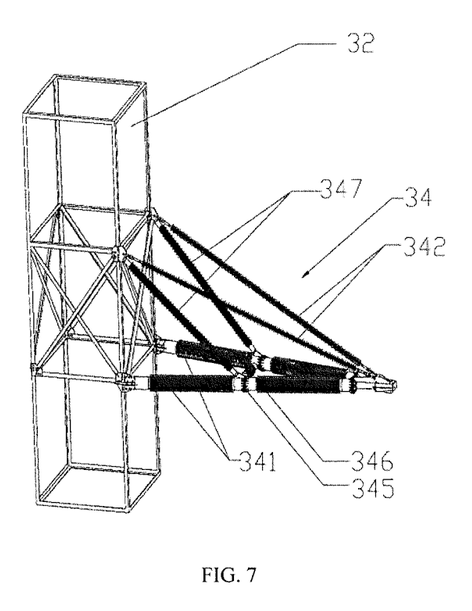
FIG. 7 is a perspective view of the structure of FIG. 5.

The composite tower for power grid transmission line 30 and the composite cross arm structure 34 in accordance with the third embodiment of the present invention are shown in FIGS. 5, 6 and 7 respectively. The difference between the embodiment and the first embodiment shown in FIGS. 1, 2 and 3 is that: as in the second embodiment, each of the two sets of cross arm insulators 341 of the composite cross arm structure 34 of the third embodiment is constituted by two hollow insulators, and the two hollow insulators are coupled with each other via a flange 345, as shown in FIGS. 6 and 7; and in addition to the two sets of cross arm insulators 341 and the set of oblique-pulling insulators 342 corresponding to each of the sets of cross arm insulators 341 respectively, the composite cross arm structure 34 of the embodiment further includes an auxiliary cross arm insulator 346 and middle insulation pulling rods 347 corresponding to each of the sets of cross arm insulators 341 respectively.

As shown in FIGS. 6 and 7, two ends of the auxiliary cross arm insulator 346 are connected to the metal flange 345 of each of the two set of the cross arm insulators 341 to make the two set of cross arm insulators 341 and the auxiliary cross arm insulator 346 form an A-shaped arrangement together horizontally. It should be understood that the direction of the A-shaped arrangement is that its opening faces the tower body and its apex is a free end adapted for hanging the transmission line. One end of the middle insulation pulling rod 347 is connected to the metal flange 345 of one hollow insulator of the set of the cross arm insulators 341, and the other arm of the middle insulation pulling rod 347 is connected to the tower over the cross arm insulator 341. The middle insulation pulling rod 347 can be a post insulator, the post insulator can be formed by pultrusion process, and its exterior has a silicon rubber material for insulation protection. It should be understood that when the two ends of the auxiliary cross arm insulator 346 are connected to the metal flange 345 of one hollow insulator that is close to the tower body, of each of the sets of cross arm insulators 341, two ends of the middle insulation pulling rod 347 are preferably connected to the metal flange 345 of one hollow insulator that is far away from the tower body, of each of the sets of cross arm insulators 341, and vice versa.

Figure 8:
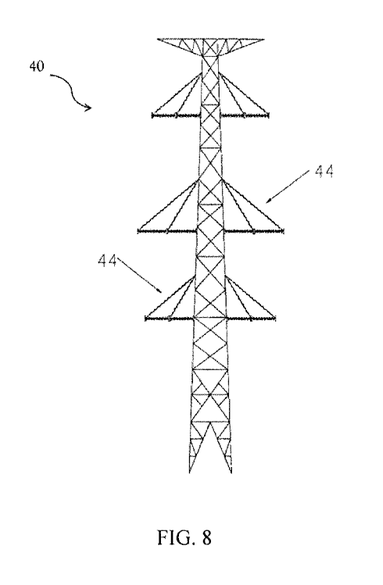
FIG. 8 is a schematic front view illustrating a composite tower for power grid transmission line, which has the composite cross arm structure as shown in FIGS. 6 and 7, in accordance with the fourth embodiment of the present invention.

FIG. 8 illustrates a composite tower 40 for power grid transmission line in accordance with the fourth embodiment of the present invention, and the composite tower 40 is a tower with a shape like a Chinese character 'gan' (干), i.e., a double circuit transmission line tower. In the embodiment, the composite tower 40 has six composite cross arm structures 44 each of which is the same as the composite cross arm structure 34 in the third embodiment as shown in FIGS. 5-7, and it needs not be repeated here.

Figure 9:
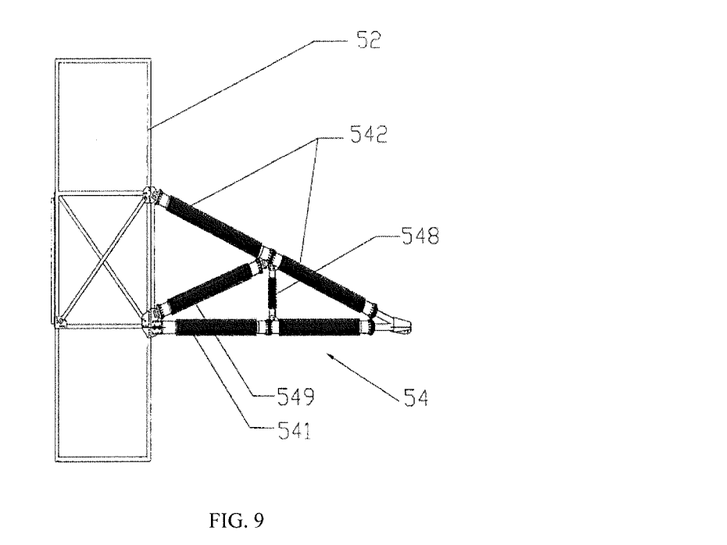
FIG. 9 is a schematic diagram illustrating a composite cross arm structure, in accordance with another embodiment of the present invention, similarly to FIG. 6.
Figure 10:
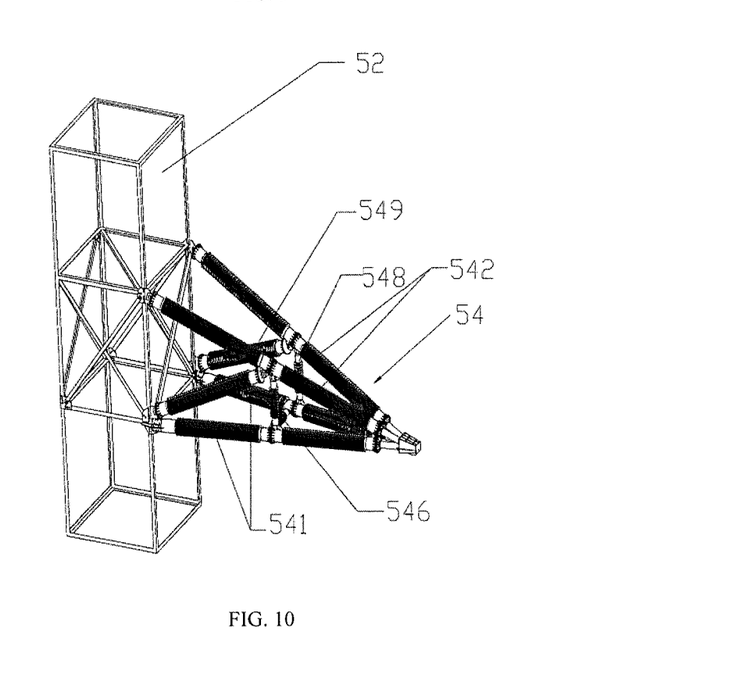
FIG. 10 is a schematic diagram illustrating the composite cross arm structure of FIG. 9, similarly to FIG. 7.

FIG. 9 is similar to FIG. 6, which illustrates another composite cross arm structure 54. FIG. 10 is similar to FIG. 7, which shows the composite cross arm structure 54 of FIG. 9. The similarities between the composite cross arm structure 54 in the embodiment and the composite cross arm structure 34 of the third embodiment as shown in FIGS. 6 and 7 is the structure and arrangement of the two sets of cross arm insulators 541 and the auxiliary cross arm insulator 546, and the different between them is that in the embodiment, the set of oblique-pulling insulators 542 is a hollow insulator, and each of the sets of oblique-pulling insulators 542 is composed of two coupled hollow insulators with respective metal flange 545. In the meantime, the two middle insulation pulling rods 347 are eliminated, and two connection insulators (i.e., second connection insulator 548 and third connection insulator 549) are used instead in the embodiment.

Specifically, in the embodiment, each of the second connection insulators 548 is adapted to be connected to one set of cross arm insulators 541 and the corresponding set of oblique-pulling insulators 542. Two ends of the second connection insulator 548 are connected to the metal flange 545 at the intermediate connection point of the set of cross arm insulators 541 and the metal flange 545 at the intermediate connection point of the corresponding set of oblique-pulling insulators 542 respectively. Each of the third connection insulators 549 is adapted to fix the set of oblique-pulling insulators 542 on the tower body. One end of the third connection insulators 549 is connected to another metal flange 545 at the intermediate connection point of the set of oblique-pulling insulators 542, and the other end of the third connection insulators 549 is connected to the tower body 52 at the first end of the cross arm insulator 541.

It should be understood that when the two ends of the auxiliary cross arm insulator 546 are connected to the metal flange 545 of one hollow insulator that is close to the tower body, of each of the sets of cross arm insulators 541 (i.e., a metal flange at the intermediate connection point of the two hollow insulators of the set of cross arm insulators close to the tower body), preferably, one end of the second connection insulator 548 is connected to the metal flange 545 of one hollow insulator that is far away from the tower body, of one set of cross arm insulators 541 (i.e., a metal flange at the intermediate connection point of the two hollow insulators of the set of cross arm insulators far away from the tower body), and the other end of the second connection insulator 548 is connected to the metal flange 545 of one hollow insulator that is far away from the tower body, of the corresponding set of oblique-pulling insulators 542 (i.e., a metal flange at the intermediate connection point of the two hollow insulators of the set of oblique-pulling insulators far away from the tower body), as shown in FIG. 10; in turn, preferably, one end of the third connection insulator 549 is connected to the metal flange 545 of one hollow insulator that is close to the tower body, of the set of oblique-pulling insulators 542 (i.e., a metal flange at the intermediate connection point of the two hollow insulators of the set of oblique-pulling insulators far close to the tower body), and the other end of the third connection insulator 549 is connected to the tower body 52 at the first end of the corresponding set of the cross arm insulators 541; and vice versa.

Although each of the two sets of cross arm insulators corresponds to one set of oblique-pulling insulators in the above embodiments, there may be only one set of oblique-pulling insulators, and the set of oblique-pulling insulators is adapted to suspend the two sets of cross arm insulators on the tower body. In addition, the set of the oblique-pulling insulators can be an insulator, and can also be formed from two coupled insulators. Further, although the flange used in the above embodiments is metallic, it should be understood that the flange can also be nonmetallic, as long as it meets the requirements of support. It also should be understood that the line insulator is elastic, and the post insulator is rigid.

The foregoing descriptions of embodiments of the present invention have been presented only for purposes of illustration and description. They are not intended to be exhaustive or to limit this disclosure. Accordingly, many modifications and variations will be apparent to practitioners skilled in the art to which the present invention pertains without departing from its spirit and scope. Accordingly, the scope of the present invention is defined by the appended claims rather than the foregoing description and the exemplary embodiments described therein.

What is claimed is:

1. A composite cross arm structure of a composite tower for a power grid transmission line, wherein the composite cross arm structure comprises: two sets of cross arm insulators arranged horizontally into a V-shaped arrangement with an apex and an opening, wherein a first end of each set of the two sets of cross arm insulators is connected to a tower body of the composite tower at the opening of the V-shaped arrangement; wherein each set of the two sets of cross arm insulators is formed from two hollow insulators connected to each other via a first flange and at least one set of oblique-pulling insulators, one end of each of the at least one set of oblique-pulling insulators is connected to a second end of the two sets of cross arm insulators at the apex of the V-shaped arrangement, and the other end of each of the at least one set of oblique-pulling insulators connected to the tower body above the two sets of cross arm insulators; and middle insulation pulling rods with each of the middle insulation pulling rods corresponding to each set of the two sets of cross arm insulators respectively, one end of each middle insulation pulling rod is connected to the first flange of each set of the two sets of cross arm insulators respectively, and the other arm of each middle insulation pulling rod is connected to the tower above each set of the two sets of cross arm insulators respectively, and wherein each of the oblique-pulling insulators is a line insulator.

2. The composite cross arm structure of the composite tower for power grid transmission line of claim 1, wherein each set of the two sets of cross arm insulators corresponds to one set of oblique-pulling insulators, with one end of the set of oblique-pulling insulators connected to the second end of the corresponding set of cross arm insulators at the apex of the V-shaped arrangement, and the other end of the set of oblique-pulling insulators connected to the tower body above the corresponding set of cross arm insulators.

3. The composite cross arm structure of the composite tower for power grid transmission line of claim 1, wherein the angle between the two sets of cross arm insulators is between 150 to 750 at the apex of the V-shaped arrangement.

4. The composite cross arm structure of the composite tower for power grid transmission line of claim 1, further comprising an auxiliary cross arm insulator, and wherein each end of the auxiliary cross arm insulator is connected to the first flange of each set of the two sets of cross arm insulators respectively, with the two sets of the cross arm insulators and the auxiliary cross arm insulator forming an A-shaped arrangement together horizontally.

5. The composite cross arm structure of the composite tower for power grid transmission line of claim 1, wherein each middle insulation pulling rod is a post insulator.

6. The composite cross arm structure of the composite tower for power grid transmission line of claim 4, wherein the oblique-pulling insulators are hollow insulators.

7. The composite cross arm structure of the composite tower for power grid transmission line of claim 6, wherein each set of oblique-pulling insulators is formed by two hollow insulators which are coupled with each other via a second flange.

8. The composite cross arm structure of the composite tower for power grid transmission line of claim 1, wherein the tower body of the composite tower is made of composite components.

9. The composite cross arm structure of the composite tower for power grid transmission line of claim 1, further comprising a tower head which is made of composite components.

10. A composite cross arm structure of a composite tower for a power grid transmission line, wherein the composite cross arm structure comprises: two sets of cross arm insulators arranged horizontally into a V-shaped arrangement with an apex and an opening, wherein a first end of each of the two sets of cross arm insulators is connected to a tower body of the composite tower at the opening of the V-shaped arrangement, wherein each of the two sets of cross arm insulators is formed from hollow insulators connected to each other via a first flange; at least one set of oblique-pulling insulators, one end of each of the at least one set of oblique-pulling insulators is connected to a second end of the two sets of cross arm insulators at the apex of the V-shaped arrangement, and the other end of each of the at least one set of oblique-pulling insulators connected to the tower body above the two sets of cross arm insulators, wherein the oblique-pulling insulators are hollow insulators with each set of oblique-pulling insulators being formed by two hollow insulators which are coupled with each other via a second flange; an auxiliary cross arm insulator, and wherein each end of the auxiliary cross arm insulator is connected to the first flange of each of the two sets of cross arm insulators respectively, with the two sets of the cross arm insulators and the auxiliary cross arm insulator forming an A-shaped arrangement together horizontally; and a first connection insulator and a second connection insulator configured to connect each of the two sets of cross arm insulators to a corresponding one of the at least one set of oblique-pulling insulators, two ends of the first connection insulator are connected to the first flange of one of the two sets of cross arm insulators and the second flange of one of the at least one set of oblique-pulling insulators respectively, one end of the second connection insulator is connected to the second flange of one of the at least one set of oblique-pulling insulators, and the other end of the second connection insulator is connected to the tower body at the first end of the corresponding one of the two sets of cross arm insulators.

* * * * *